(12) United States Patent  
Millington

(10) Patent No.: US 6,711,499 B2
(45) Date of Patent: Mar. 23, 2004

(54) NAVIGATION SYSTEM WITH RUN-TIME TRAINING INSTRUCTION

(75) Inventor: Jeffrey Alan Millington, Rochester Hills, MI (US)

(73) Assignee: Magellan Driver Information Systems, Inc., Rochester Hills, MI (US)

( * ) Notice: Subject to any disclaimer, the term of this patent is extended or adjusted under 35 U.S.C. 154(b) by 140 days.

(21) Appl. No.: 10/092,910

(22) Filed: Mar. 7, 2002

(65) Prior Publication Data

US 2002/0087267 A1 Jul. 4, 2002

Related U.S. Application Data

(63) Continuation-in-part of application No. 09/679,671, filed on Oct. 5, 2000, now abandoned.

(51) Int. Cl.[7] ........................... G01C 21/04; G06F 19/00
(52) U.S. Cl. ....................... 701/211; 701/201; 701/209; 710/1; 340/990; 369/30.01
(58) Field of Search ................. 701/211, 201, 701/209; 710/1; 340/990; 369/30.01

(56) References Cited

U.S. PATENT DOCUMENTS

| | | | |
|---|---|---|---|
| 5,944,768 A | 8/1999 | Ito et al. | 701/200 |
| 5,999,908 A * | 12/1999 | Abelow | 705/1 |
| 6,037,942 A | 3/2000 | Millington | |
| 6,240,369 B1 * | 5/2001 | Foust | 702/3 |

2002/0026339 A1 * 2/2002 FranKland et al. ............ 705/7

FOREIGN PATENT DOCUMENTS

| | | |
|---|---|---|
| EP | 0566229 A2 | 2/1993 |
| EP | 0582536 A1 | 6/1993 |
| EP | 0566228 A2 * | 8/1993 |
| WO | WO 00/08556 | 2/2000 |

OTHER PUBLICATIONS

Search Report for PCT/US01/31361, filing date of Oct. 5, 2001.

* cited by examiner

Primary Examiner—Thomas G. Black
Assistant Examiner—Ronnie Mancho
(74) Attorney, Agent, or Firm—Lowe Hauptman Gilman & Berner, LLP

(57) ABSTRACT

A navigation system includes a database of a plurality of roads, a position determining system, an input device, and a route determination system. A CPU samples user inputs and a counter keeps track of the number of occurrences of those user inputs which achieve a particular user desired result. The CPU identifies the user inputs which achieve a particular result and stores such inputs within a user input database maintained in a storage device. The CPU continues to store the user inputs which achieve a desired user result until a predetermined number of "N" occurrences is reached. After reaching the "N" number of occurrences, it has become apparent that this is not an infrequent inefficient input by the user. The CPU will then display a suggestion screen which provides a predetermined suggested input tailored to the prior inefficient user inputs.

26 Claims, 5 Drawing Sheets

| OCCURRENCES | USER INPUT | | RESULT |
|---|---|---|---|
| 1 | → | ↑ | "C" |
| 2 | → | ↑ | "C" |
| ⋮ | ⋮ | ⋮ | ⋮ |
| "N" | → | ↑ | "C" |

*Fig-5A*

| OCCURRENCES | USER INPUT | | RESULT |
|---|---|---|---|
| 1 | → | ↑ | "C" |
| 2 | → | ↑ | "U" |
| 3 | → | ↑ | "3" |
| ⋮ | ⋮ | ⋮ | ⋮ |
| "N" | → | ↑ | "RESULT" |

*Fig-5B*

NAVIGATION SYSTEM WITH RUN-TIME TRAINING INSTRUCTION

BACKGROUND OF THE INVENTION

The present application is a continuation-in-part of U.S. application Ser. No. 09/679,671, filed Oct. 5, 2000 now abandoned.

This invention generally relates to navigation or route guidance systems and, more particularly, to a system which provides suggested operating instructions for more efficient system usage.

Navigation systems generally provide a recommended route to a desired destination. Generally, the desired destination is selected from a large database of roads stored in a mass media storage which includes the roads in the area to be traveled by the user. If the navigation system is installed in a vehicle, the starting point is typically associated with the vehicle position and can be input to the navigation system by an associated position determining system that usually includes a GPS (Global Positioning System) receiver.

Interfacing with the system usually requires input and output devices. One such interface is an Operator Interface Module ("OIM") which includes a display, such as a high resolution flat panel display, and an audio speaker. The OIM also includes in put devices such as a plurality of buttons and directional keypad, but can also include a mouse, keyboard, keypad, remote device or microphone.

To access system features, input selections, and otherwise interact with the system, a user is typically required to make multiple keystrokes or other inputs. Although OIM based systems provide an efficient interface, a user often learns only basic operation of the system overlooking faster or alternative methods to achieve the same result. Also, some users may forget how to access certain system features.

It is thus desirable to provide a system which suggests operating instructions to improve interaction with the navigation system.

SUMMARY OF THE INVENTION

In general terms, this invention provides a suggested input in response to inefficient user operating of the navigation system.

The navigation system generally includes a database of a plurality of roads, a position determining system, an input device, and a route determination system. The position determining system determines a position of the vehicle relative to the plurality of roads. The user selects a destination from the database with the input device. The navigation system then calculates and displays a recommended route directing the driver of the vehicle to the desired destination.

The CPU samples user inputs and a counter keeps track of the number of occurrences of those user inputs which achieve a particular user desired result. The CPU identifies the user inputs which achieve a particular result and stores such inputs within a user input database maintained in a storage device. The CPU will preferably sort and store all or certain other predetermined user inputs within predetermined databases or database portions. The CPU continues to store the user inputs which achieve a desired user result until a predetermined number of "N" occurrences is reached.

It should be realized that a plurality of user input databases will thereby be created. Each database for each symbol or navigation system feature activation. The sorting arrangement of the database or database portions is preferably implemented by known database sorting and structuring algorithms.

After reaching the "N" number of occurrences, it has become apparent that this is not an infrequent inefficient input by the user. The CPU will then display a suggestion screen which provides a predetermined suggested input tailored to the prior inefficient user inputs. The predetermined suggested input for each result is preferably stored as a suggestion database also maintained in the storage device. The suggestion screen can be complimented by voiced instructions through an audio speaker and preferably includes a help link to provide further instructions. However, the user can choose to avoid further suggestions by selecting an abort link.

After the suggestion screen is displayed, the database is reset and the procedure can begin again. The procedure can begin immediately or may be delayed for a predetermined period of time to avoid too many suggestions in too frequent of a time period.

In another embodiment, the CPU includes a timer. The timer counts down a predetermined period of time when the navigation system is awaiting an input and no user input occurs. Should no inputs be made within the predetermined period of time, the CPU will identify that the user is not efficiently using the navigation system and will display a suggestion screen which provides further information.

BRIEF DESCRIPTION OF THE DRAWINGS

These and other features and advantages of this invention will become more apparent to those skilled in the art from the following detailed description of the presently preferred embodiment. The drawings that accompany the detailed description can be described as follows.

FIG. 5A illustrates a methodology for sorting user inputs and results within the database of FIG. 4;

FIG. 5B illustrates another methodology for sorting user inputs and results within the database of FIG. 4;

DETAILED DESCRIPTION OF A PREFERRED EMBODIMENT

Figure 1:
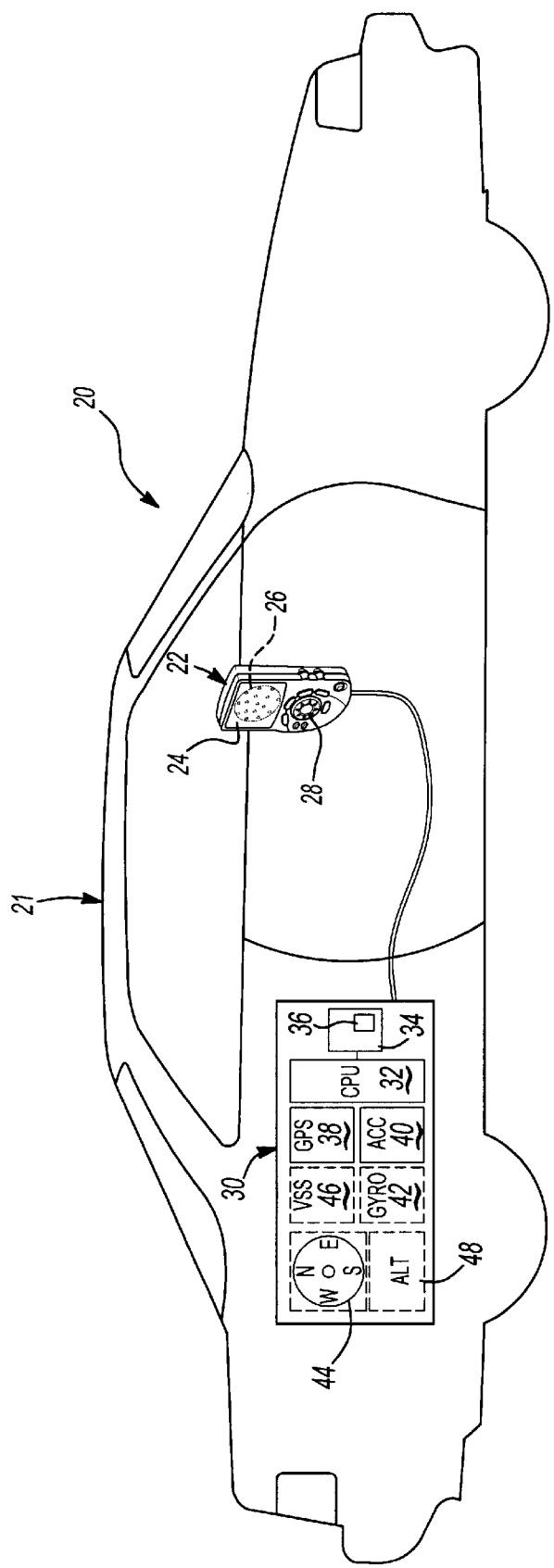
FIG. 1 is a schematic of a navigation system according to the present invention.

The navigation system 20 of the present invention is shown schematically in FIG. 1 installed in a vehicle 21. The navigation system 20 includes an Operator Interface Module ("OIM") 22 including input and output devices. The OIM 22 includes a display 24, such as a high resolution LCD or flat panel display, and an audio speaker 26. The OIM 22 also includes input devices 28, preferably a plurality of buttons and directional keypad, but alternatively including a mouse, keyboard, keypad, remote device or microphone. Alternatively, the display 24 can be a touch screen display.

The navigation system 20 further includes a computer module 30 connected to the OIM 22. The computer module 30 includes a CPU 32 and storage device 34 connected to the CPU 32. The storage device 34 may include a hard drive, CD ROM, DVD, RAM, ROM or other optically readable storage, magnetic storage or integrated circuit. The storage device 34 contains a database 36 including a map of all the roads in the area to be traveled by the vehicle 21 as well as the locations of potential destinations, such as addresses, hotels, restaurants, or previously stored locations. The software for the CPU 32, including the graphical user interface, route guidance, operating system, position-determining software, etc may also be stored in storage device 34 or alternatively in ROM, RAM or flash memory.

The computer module 30 preferably includes navigation sensors, such as a GPS receiver 38 and an inertial sensor, which is preferably a multi-axis accelerometer 40. The computer module 30 may alternatively or additionally include one or more gyros 42, a compass 44, a wheel speed sensor 46 and altimeter 48, all connected to the CPU 32. Such position and motion determining devices (as well as others) are well known and are commercially available.

The navigation system 20 propagates the position of the vehicle 21 relative to the map database 36, i.e. relative positions on road segments and intersections ("nodes"). The navigation system 20 also determines the current location of the vehicle 21 in terms of latitude and longitude. Utilizing any of a variety of known techniques, the position of the vehicle 21 relative to the database 36 and/or in terms of latitude and longitude is determined at least in part based upon the motion signals from the multi-axis accelerometer 40. The current local time and date can be determined from the GPS signals received by the GPS receiver 38.

Generally, the CPU 32 and position and motion determining devices determine the position of the vehicle 21 relative to the database 36 of roads utilizing dead reckoning, map-matching, etc. Further, as is known in navigation systems, the user can select a destination relative to the database 36 of roads utilizing the input device 28 and the display 24. The navigation system 20 then calculates and displays a recommended route directing the driver of the vehicle 21 to the desired destination. Preferably, the navigation system 20 displays turn-by-turn instructions on display 24 and gives corresponding audible instructions on audio speaker 26, guiding the driver to the desired destination.

Figure 2:
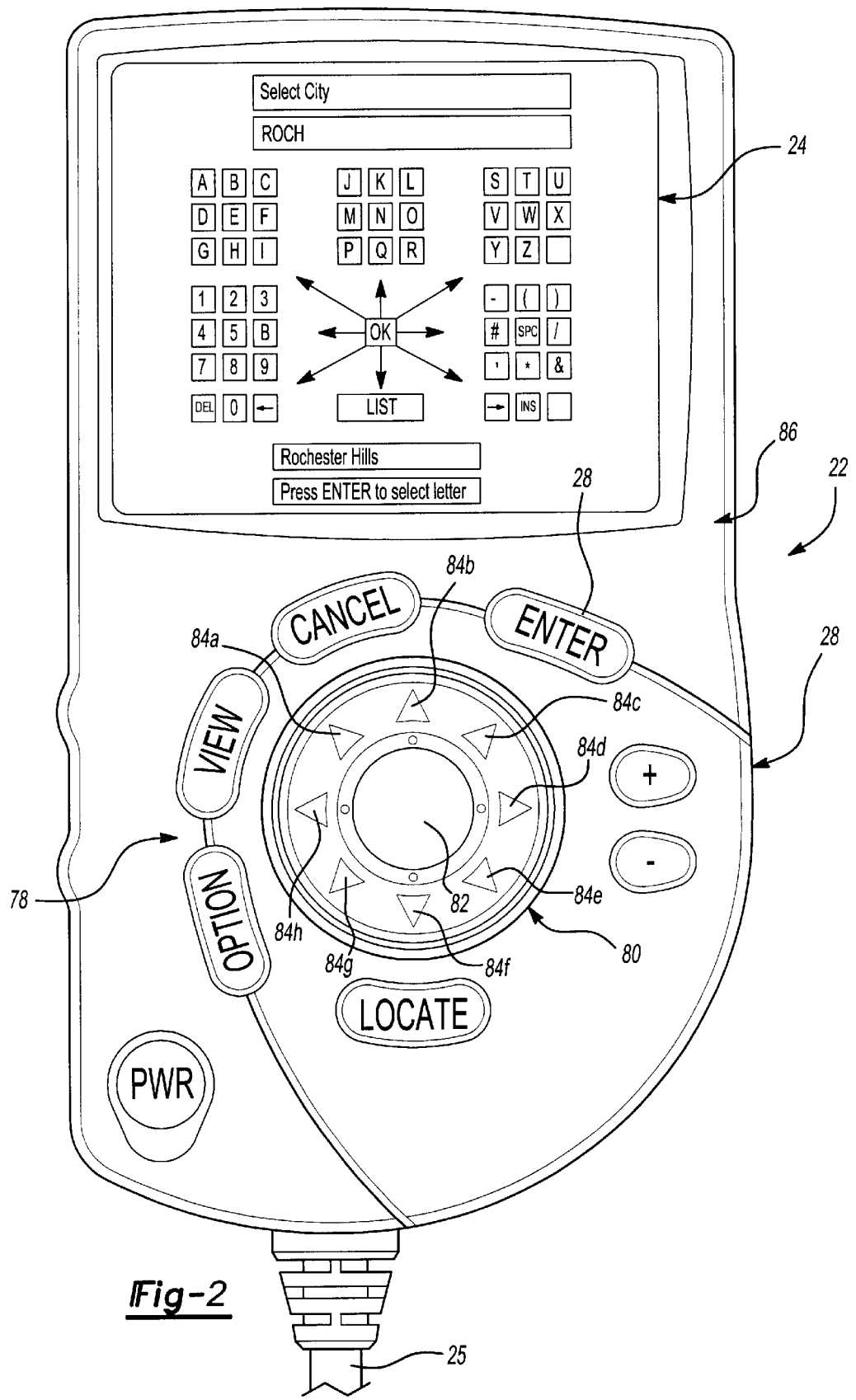
FIG. 2 is an expanded view of the OIM of the navigation system illustrated in FIG. 1 having an eight way button which could be used as the directional input device.

FIG. 2 is a perspective view of one disclosed embodiment of the display device 24 and directional input device 28, preferably designed as an integral unit attached to the CPU by connection 25. The display device 24 includes a screen such as a high resolution LCD or flat panel display. The directional input device 28 includes a multiple of input buttons 78 including, preferably, an eight-way button shown generally at 80 and a selection key 86 such as an "Enter" key. Although an eight-way button is shown, it will be realized that other input devices, such as a joystick, mouse or roller ball can be employed.

The eight-way button 80 preferably includes an internal disk 82 pivotally mounted in the eight-way button 80. The internal disk 82 is capable of moving in the direction of any one of the directional arrow 84a–h. Movement of the internal disk 82 in the direction of one of the directional arrows 84 transmits a directional signal.

Figure 3:
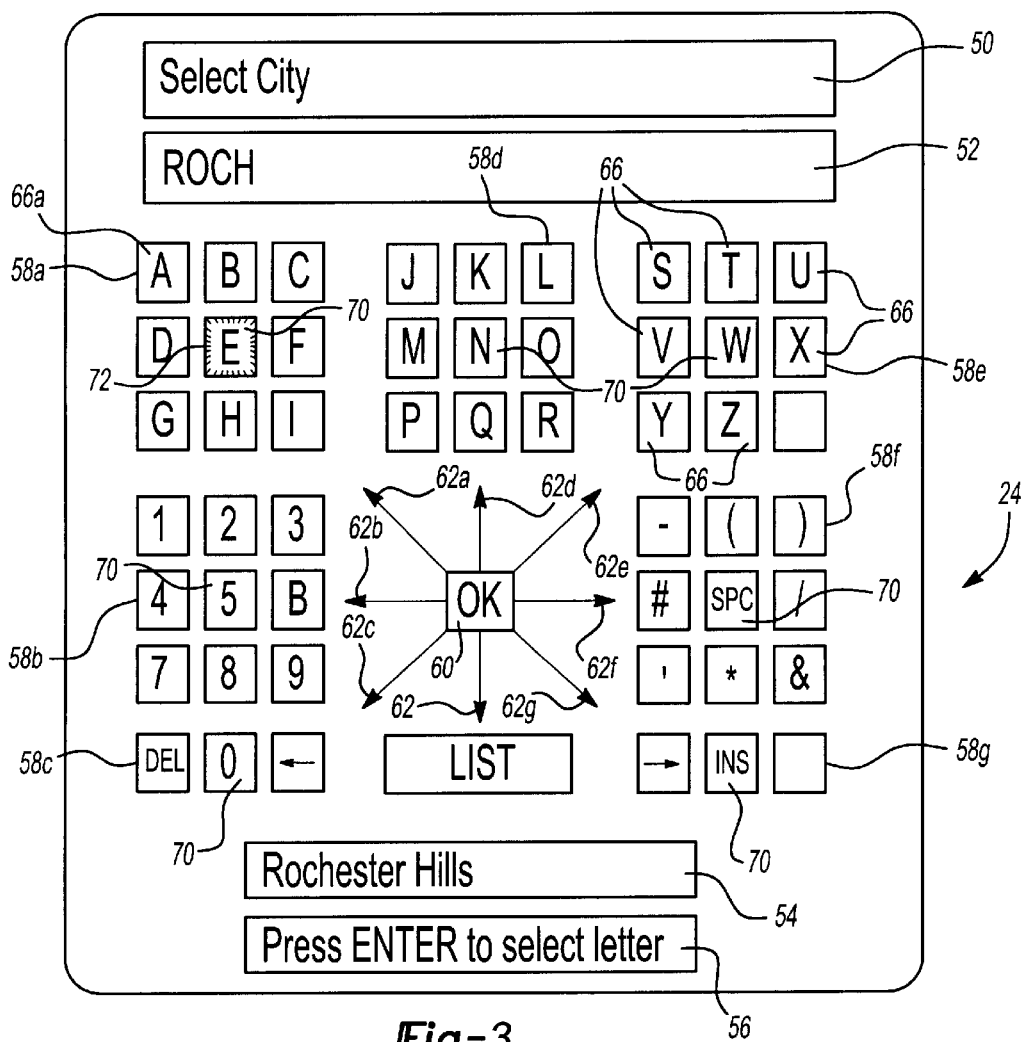
FIG. 3 is a screen display of an embodiment of the graphic user interface of the present invention showing a "select City" screen.

FIG. 3 is a screen display of an embodiment of the graphical user interface of the present invention illustrating the category of "select city". The display device 24 includes a category field 50 that displays a user selected category of information. The category of information selected is destination city. The display device 24 further includes a type field 52, a lookahead field 54, and an instructional field 56. A plurality of groups 58a through 58g are arranged around a start position 60. Each group 58 is located in a unique, predetermined direction 62a through 62g relative to the start position 60. A first group 58a is located in an upper left direction relative to the start position 60. Each group 58 includes a plurality of symbols 66. The symbols 66 in each group 58 are arranged around a central position 70, which also comprises a symbol 66, in the group 58. The first group 58a includes a first symbol 66a.

Preferably, the display device 24 only activates symbols 66 that can be selected by the user based on the category of information selected. After a user has selected a category of information, for instance Select Destination City, the display device 24 displays a screen similar to that shown in FIG. 3. In the category field 50 will be displayed the category of information. Initially, the type field 52 can be blank and the start position 60 is activated.

Alternatively, the first City in the database 36, for example only, "Aaron" could be displayed in the type field 52. If the user then sends a selection signal from the directional input device 28, "Aaron" will be selected.

A user selects the desired symbol 66 by pressing the directional arrow 84a–h of the eight-way button 80 (FIG. 2). The central symbol 70 of the related group 58 that corresponds with the particular directional arrow 84a–84h and direction 62a–62g is thereby activated. In FIG. 3, the symbol E is shown as an activated symbol 72. An "activated" symbol 66 or the start position 60 may be indicated by a change in color, a brightening, an outline, flashing, or other known destructive markings.

To select a non-central symbol 66, further activation of the desired directional arrows 84a–h will activate the corresponding symbol 66. Although such activation is efficient and intuitive, it has been determined that many users avoid the usage of the diagonal directional arrows 84b,d,f,h (FIG. 2). For example, to select the "C" symbol many users will activate the right directional arrow 84e (direction 62e) then activate the up directional arrow 84c (direction 62c). This is inefficient.

As will be further described below the navigation system 20 according to the present invention will provide the user with a suggested input to achieve the user's desired result in a more efficient manner. Although the suggested usage of a diagonal directional arrow is a rather uncomplicated example, it will be realized that many other operations will benefit from the present invention. Accordingly, by recognizing inefficient user inputs and by providing the user with a more efficient suggested input, the user will be trained to use the navigation system in the most efficient manner.

Figure 4:
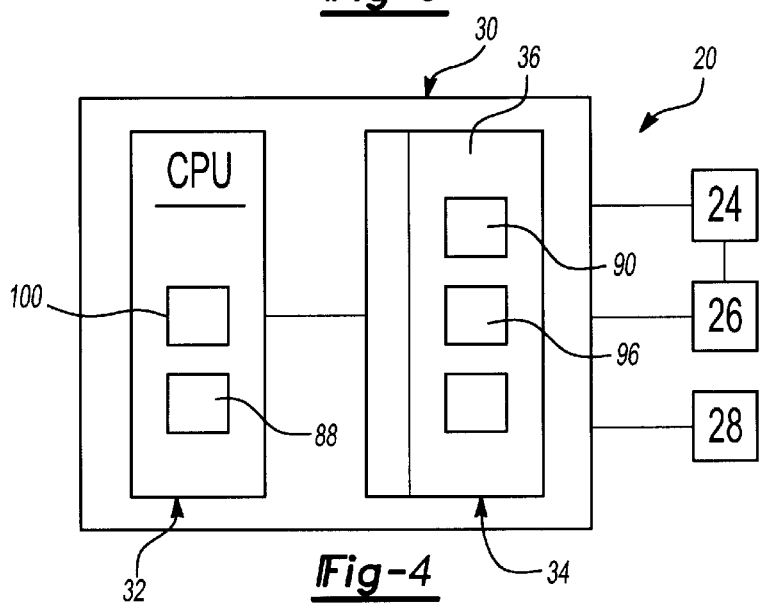
FIG. 4 is a schematic view of a processor connected to a storage device containing a plurality of databases, a display device, and a directional input device.

FIG. 4 is a schematic view of one embodiment of the navigation system 20. The computer module 30 is connected to the display device 24, the audio speaker 26, and the directional input device 28. The CPU 32 includes a counter 88 and a timer 100 preferably implemented in software. The storage device 34 includes a user input database 90 and a suggestion database 96. Although only the user input database 90 and the suggestion database 96 are schematically illustrated, it should be realized that a multiple of databases or database portions can be created within the storage device 34.

The CPU 32 samples user inputs and the counter 88 keeps track of the number of occurrences of those user inputs which achieve a particular user desired result. As described above, one example of such user inputs is the activation of the right directional arrow 84e and the up directional arrow 84c to achieve the result of selecting the "C" symbol after selecting group 58a (FIGS. 2 and 3).

Referring to FIG. 5A, the CPU 32 identifies the user inputs 89 which achieve a particular result and stores such inputs 89 within the user input database 90 maintained in the storage device 34 (FIG. 4). As schematically represented, the user input database 90 stores the user inputs 89 which achieve a desired user result 91 until a predetermined number of occurrences "N" is reached. The user input database 90 illustrated in FIG. 5A is preferably a table-like format implemented by known database software programs. For example only, the user input database 90 includes an "N" number of identical user inputs 89 which achieve a desired user result 91 which, in this example, is the symbol "C".

It should be realized that the CPU 32 will sort and store all or certain other predetermined user inputs within predetermined databases of database portions within the storage device 34 (FIG. 4). The CPU 32 will then sort the user inputs in relation to the result achieved 91 into an appropriate database. A plurality of user input databases will thereby be created. Each database for each symbol or navigation system feature activation. The sorting an arrangement of the database or database portions is preferably implemented by known database sorting and structuring algorithms.

As illustrated in FIG. 5B, the results can additionally or alternatively be sorted in relation to the user inputs 89' rather than the result achieved 91'. In the alternate embodiment of FIG. 5B, all user inputs 89' which select a symbol by using the right directional arrow 84e and the up directional arrow 84c are included within the user input database 90'. Moreover, inefficient input with the right directional arrow 84e and the up directional arrow 84c during other operations such as map panning are likewise included. In other words, a user who consistently uses the right directional arrow 84e and the up directional arrow 84c instead of the diagonal directional arrow 84d are sorted together to more quickly achieve the "N" number of occurrences.

Figure 5C:
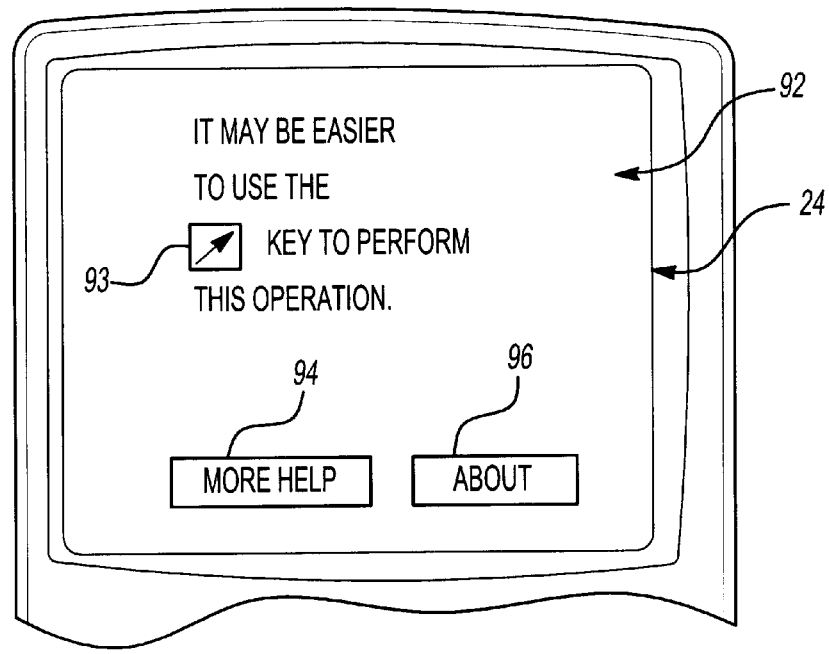
FIG. 5C illustrates a screen display of an embodiment of the graphic user interface of the present invention showing a suggested input screen.

As illustrated in FIG. 5C, after reaching the "N" number of occurrences, it has become apparent that this is not an infrequent inefficient input by the user. The "N" number of occurrences allows the CPU 32 to identify that the user is not efficiently using the navigation system 20. The CPU 32 will then display a suggestion screen 92 which provides a predetermined suggested input 93 tailored to the prior inefficient user inputs 89 (FIGS. 5A, 5B).

The predetermined suggested input 93 for each result is preferably stored as a suggestion database 96 also maintained in the storage device 34 (FIG. 4). The suggestion database 96 is preferably a look-up table within the storage device 34 to which the CPU 32 can refer. The suggestion screen 92 can be complimented by the voiced instructions through the audio speaker 26 (FIG. 4). Moreover, the suggestion screen 92 preferably includes a help link 94 to provide further instructions. However, the user can choose to avoid further suggestions by selecting an abort link 96.

After the suggestion screen 92 is displayed, the database 90,90' is reset and the procedure can begin again. The procedure can begin immediately or may be delayed for a predetermined period of time to avoid too many suggestions in too frequent of a time period.

In another embodiment, the user input database 90,90' (FIGS. 5A,5B) for the particular result 91,91' are cleared when the user input 89,89' is equivalent to the suggested input prior to "N" occurrences. In other words, if in the examples of FIGS. 5A and 5B should the user input be the diagonal directional arrow 84d before "N" number of occurrences, a reset will occur.

In yet another embodiment, the counter 88 is increased whenever the quantity of user inputs 89 which achieve a result 91 is greater than the quantity of suggested user inputs which achieve that result. For example, the number of user inputs 89 when a user consistently uses the right directional arrow 84e and the up directional arrow 84c is two (2) compared to the suggest number of user inputs—one (1)— when a user uses the diagonal directional arrow 84d. After reaching the "N" number of occurrences the CPU 32 will then display the suggestion screen 92 (FIG. 5C).

Figure 5D:
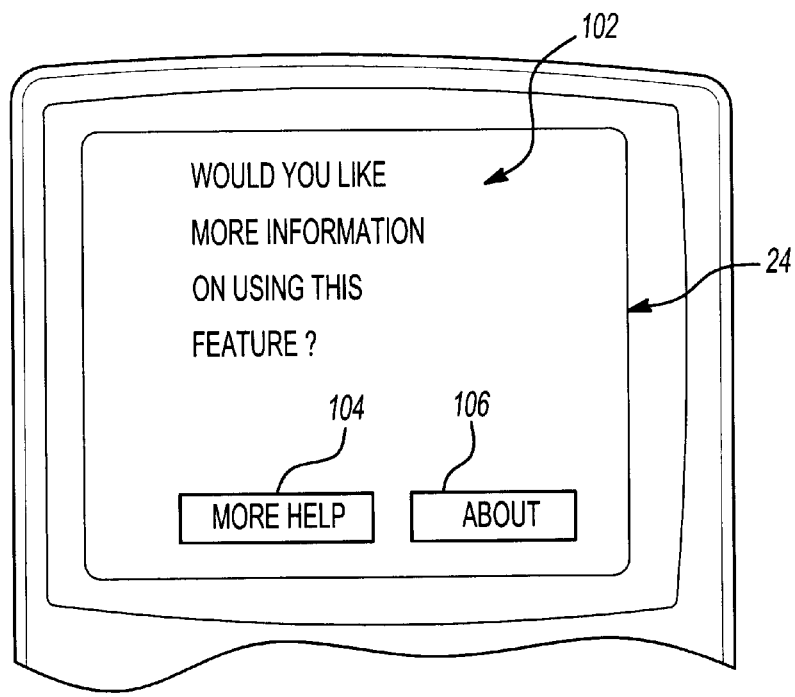
FIG. 5D illustrates a screen display of an embodiment of the graphic user interface of the present invention showing a feature information screen.

In another embodiment, the navigation system includes a timer 100 as illustrated schematically in FIG. 4. The timer 100 counts down a predetermined period of time when the navigation system is awaiting an input and no user input occurs. For example, during the screen display of the category of "select city" (FIG. 3), the timer 100 is counting down. Should no inputs be made within the predetermined period of time, the CPU 32 will identify that the user is not efficiently using the navigation system 20 and will display a suggestion screen 102 (FIG. 5D). The suggestion screen 102 preferably includes a help link 104 to provide further information. However, the user can choose to avoid further suggestions by selecting an abort link 106.

The suggestion screen 102 offers the user an opportunity to access further instructions on the particular category (in this example, the "select city" category) from which the timer 100 timed out. The timer function is particularly advantageous for a new user, who may not understand what to do next.

As another example, many users have the tendency to scroll through the look ahead field 54. This may be rather time consuming as the look ahead field 54 is preferably provided in alphabetical order. A user looking for Rochester Hills would have to scroll through all that begin with the letters A–Q. This could be many hundreds of cities.

Typically, to scroll individually a user must repetitively activation the down direction arrow 84f (FIG. 2) to continually scroll through the list of cities. In response to this continued scrolling, the CPU 32 (FIG. 4) will identify that this is an occurrence of inefficient user input. Preferably, the CPU 32 will determine the efficiency of this type of inefficient user input by identifying that a predetermined "N" number of entries in the list have been individually scrolled through. Alternatively or in addition, the timer 100 can track the period of time during which a user is continuously scrolling through the list.

Upon determination that the user is not efficiently using the navigation system 20 the CPU 32 will display a suggestion screen 92 (FIG. 5C). The suggestion screen 92 will preferably provide another predetermined suggested input 93 such as, in this example, "It may be easier to page through the list by using the ⇒ key. " (right direction arrow 84c). The user will then learn to page through the list by groups of elements which begin with the same letter. In other words the user will reach the cities which begin with "R" with only eighteen (18) right direction arrow 84c inputs.

The foregoing description is exemplary rather than defined by the limitations within. Many modifications and variations of the present invention are possible in light of the above teachings. The preferred embodiments of this invention have been disclosed, however, one of the ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle navigation system comprising:
   a database including a plurality of roads;
   a user input device for selecting a desired destination relative to said database of roads;
   a CPU for sampling a plurality of user inputs to said user input device which achieve a result, said CPU determining an efficiency of said plurality of user inputs in relation to said result; and
   a display for displaying a predetermined suggested input to achieve said result if said efficiency is below a predetermined efficiency.

2. A vehicle navigation system as recited in claim 1, wherein said result includes a particular vehicle navigation system feature activation.

3. A vehicle navigation system as recited in claim 1, wherein said result includes a symbol selection.

4. A vehicle navigation system as recited in claim 1, wherein said predetermined efficiency is stored within said database in relation to said result.

5. A vehicle navigation system as recited in claim 1, further includes a counter, said efficiency including said counter being increased in relation to said plurality of user inputs and said result, said display displaying said predetermined suggested input if said counter exceeds a predetermined quantity.

6. A vehicle navigation system as recited in claim 1, further includes a timer, said efficiency including said timer being increased in relation to a continued series of said plurality of user inputs.

7. A vehicle navigation system as recited in claim 1, wherein said predetermined suggested input is stored as a table within said database.

8. A vehicle navigation system as recited in claim 7, wherein said predetermined suggested input includes a plurality of suggested inputs, said plurality of suggested inputs being less than said plurality of user inputs.

9. A vehicle navigation system as recited in claim 7, wherein said predetermined suggested input includes a single suggested input that replaces said plurality of user inputs.

10. A vehicle navigation system as recited in claim 1, further comprising an audio speaker, said CPU generating an audio predetermined suggested input in association with said display displaying said predetermined suggested input.

11. A vehicle navigation system as recited in claim 1, wherein said display displays an instructional text in association with said predetermined suggested input.

12. A vehicle navigation system as recited in claim 11, wherein said predetermined suggested input is associated to a category of information request displayed on said display during which said timer exceeds said predetermined time period.

13. A vehicle navigation system as recited in claim 11, wherein said timer is predetermined time period is included in calculating a user efficiency.

14. A vehicle navigation system comprising:
    a database including a plurality of roads;
    a user input device for selecting a desired destination relative to said database of roads;
    a CPU for recognizing a user input to said user input device; and
    a display for displaying a predetermined suggested input if a timer exceeds a predetermined time period during which no user inputs are recognized by said CPU.

15. A method for instructing a navigation system user including the steps of:
    (a) sampling a plurality of user inputs which achieve a result;
    (b) determining an efficiency of said plurality of user inputs in relation to said result; and
    (c) displaying a predetermined suggested input to achieve said result if said efficiency determined in said step (b) is below a predetermined efficiency.

16. A vehicle navigation system as recited in claim 15, wherein said predetermined suggested input includes a plurality of suggested inputs.

17. A vehicle navigation system as recited in claim 15, wherein said predetermined suggested input includes a single suggested input that replaces said plurality of user inputs.

18. The method of claim 15 wherein said step (b) includes counting each of said plurality of user inputs.

19. The method of claim 15 wherein said efficiency is related to a quantity of said plurality user inputs.

20. The method of claim 19 wherein said counting is reinitiated if said plurality of user inputs is equivalent to said suggested input.

21. The method of claim 20 wherein said efficiency is related to a predetermined quantity of a user set.

22. The method of claim 15 wherein said efficiency is related to a time period during which a continued series of said plurality of user inputs is entered.

23. The method of claim 22 wherein said predetermined efficiency is related to said time period.

24. The method of claim 15 wherein said predetermined efficiency is related to said suggested input.

25. The method of claim 15 wherein said step (b) includes defining each of said plurality of user inputs which achieve said result as a single user set.

26. The method of claim 25 wherein said step (b) includes counting each user set.

* * * * *